June 22, 1937. F. STOCKER 2,084,602
COFFEE MAKER FILTER
Filed Sept. 8, 1936
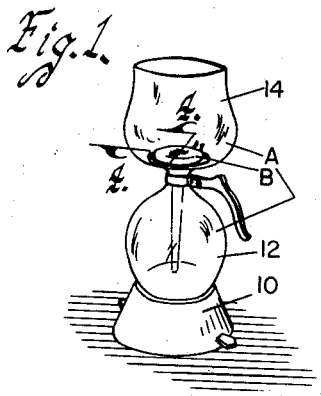
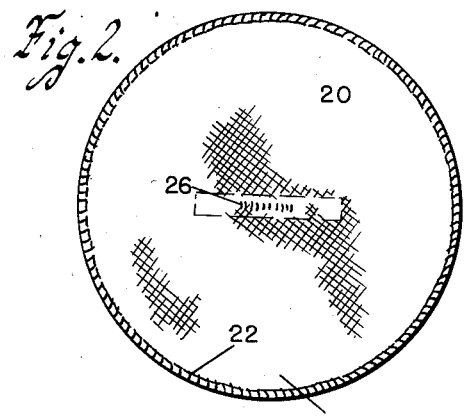
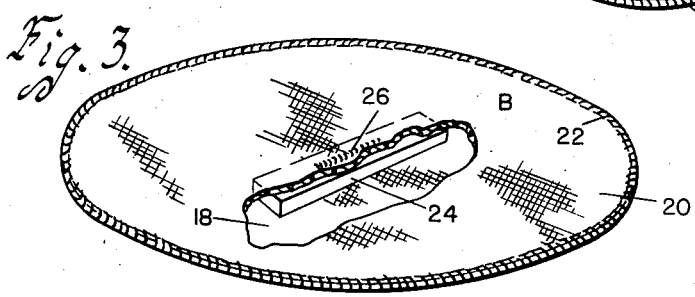
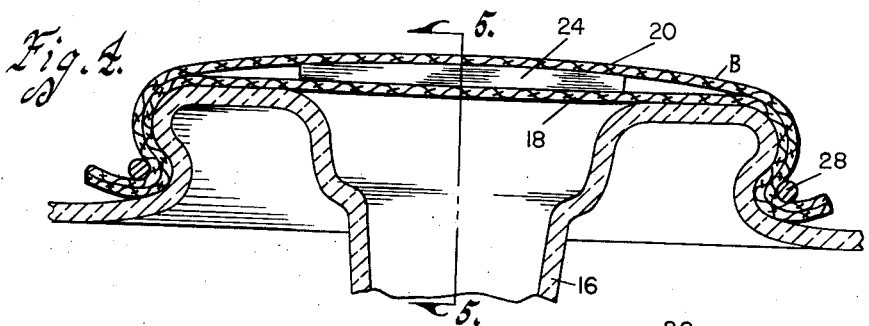
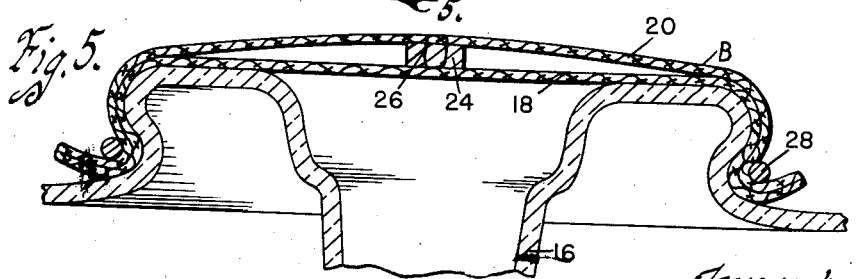
Inventor
Frederick Stocker
by Bair, Freeman, & Sinclair
Attorneys
Witness
H. S. Munzenmaier Patented June 22, 1937

2,084,602

UNITED STATES PATENT OFFICE 2,084,602

COFFEE MAKER FILTER

Frederick Stocker, Chicago, Ill., assignor to National Stamping & Electric Works, Chicago, Ill., a corporation of Illinois Application September 8, 1936, Serial No. 99,768

3 Claims. (Cl. 210—162)

An object of my invention is to provide a simple, durable and inexpensive filter for a coffee maker or the like.

A further object is to provide a filter construction which has an improved filter action resulting in a hastening of the operation of the coffee maker.

Still another object is to provide a filter for use in combination with a coffee maker having a ground coffee receptacle and a well depending therefrom, the filter being positioned to bridge the well, and means being provided to prevent sagging of the filter into the well during the operation of the coffee maker.

Still a further object is to provide a filter in the form of a pair of filter disks separated by a bridging insert which serves the purpose of both separating the disks from contact with each other and bridging the well of the coffee maker to prevent sagging of the filter into the well during operation of the coffee maker.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1 is a perspective view of a coffee maker with which my filter is associated.

Figure 2 is an enlarged plan view of the filter per se.

Figure 3 is a perspective view of the filter.

Figure 4 is an enlarged, detail, sectional view on the line 4—4 of Figure 1 showing the filter in filtering position relative to the portion of the coffee maker with which it coacts; and Figure 5 is a similar sectional view on the line 5—5 of Figure 4.

On the accompanying drawing I have used the reference numeral 10 to indicate a stove or the like on which a coffee maker A is located. The coffee maker comprises a lower bowl 12 and an upper bowl 14. The bowl 14 has a depending well 16 which has a gasket connection with the neck of the lower bowl 12 in the usual manner of vacuum type coffee makers, such as shown in my co-pending application Serial Number 99,769, filed September 8, 1936.

My present invention has to do with a filter per se rather than the coffee maker, and the filter will now be described in detail.

The filter is indicated generally at B and comprises a pair of disks, the lower one being indicated at 18 and the upper one at 20. These are secured together around their peripheries by stitching or the like, such as indicated at 22. Between the disks a bridging insert 24 is positioned. This insert is preferably secured to at least one of the disks, such as by stitching indicated at 26. The insert 24 may be made of any suitable composition of sufficient stiffness to prevent sagging of the filter, as will hereinafter be more fully set forth. By way of example, a strip of stiff felt about one-eighth of an inch thick may be used.

The filter B is adapted to be secured in position in the coffee maker in the usual manner, such as by a clamp ring 28 formed of spring wire.

Heretofore filters have been provided in the form of cloth disks of one or more thicknesses, held in position by the clamp ring 28. A quantity of ground coffee is placed in the upper bowl 14. During the operation of the coffee maker, water in the lower bowl 12 is heated by the stove 10 and generates steam which displaces the water through the well 16 into the upper bowl 14, and this heated water passes up through the ground coffee. After the water has been displaced from the lower bowl 12, to a level coincident with the lower end of the well 16, the stove 10 is turned off, whereupon the lower bowl will cool and a vacuum will be formed therein which will draw the hot water from the upper bowl 14 back through the ground coffee and the filter and into the lower bowl.

With former types of filters, the ground coffee collected on the filter and the fine particles thereof filled the pores of the filter, due to the sagging of the filter into the well, thus retarding the return of the water.

Due to the vacuum formed in the lower bowl 12, considerable pressure is exerted on the upper surface of the filter, to cause such sagging of the filter into the well 16. Such sagging further closes the pores of the filter cloth, especially where more than one thickness of cloth is provided, and it is usually necessary to have more than one thickness to prevent fine particles of the ground coffee returning into the lower bowl with the liquid coffee.

I have found that if the filter can be kept from sagging, the return of the liquid coffee can be accomplished in from one-third to one-half the usual time required. This is very desirable as coffee can be made more quickly, and when the operation is completed, the coffee has not been cooled off to an undesirable extent.

By providing the insert 24, as illustrated in Figure 4, substantially bridging the upper end of the well 16, the filter cloth is prevented from sagging and thus the pores of the cloth are held in a more open position.

Further, since the bridging element 24 is of substantial thickness, as shown in Figure 5, the two filter elements 18 and 20 are kept spaced apart which further prevents clogging of the pores of the filter. I thus secure with my construction speedy and more thorough filtration of the liquid coffee, and I do so with a very simple and inexpensive feature applied to the filter in the form of the bridging element 24.

Some changes may be made in the construction and arrangement of the parts of my device without departing from the real spirit and purpose of my invention, and it is my intention to cover by my claims any modified forms of structure or use of mechanical equivalents, which may be reasonably included within their scope.

I claim as my invention:

1. A filter device for use in a coffee making apparatus, comprising a pair of cloth filter discs adapted to lie in a horizontal plane, a bridging insert between said discs, said bridging insert being of narrow width, thereby leaving the major portion of the cloth discs open for quick flow of liquid from one side to the other of the filter device, said insert being of less length than the diameter of said discs, whereby the portions of the discs beyond the ends of the inserts remain flexible for mounting purposes, said insert being sufficiently thick to hold the portions of the discs adjacent the insert spaced from each other, and means for securing the peripheries of said discs together to form a unitary device.

2. In a filter device for use over the top of a well of a coffee maker, a pair of filter discs adapted to span said top of said well and to lie in a horizontal plane, a semi-rigid bridging insert between said discs to prevent sagging of the discs into the well, said bridging insert being of sufficient thickness to retain the portions of the discs adjacent the insert spaced from each other, means for securing the peripheries of said discs together, and means for preventing displacement of said bridging insert relative to one of said discs, said bridging insert being substantially bar-like in shape and of less length than the diameter of said filter discs, but of sufficient length to span the distance across the coffee maker well and terminate short of the edges of the discs, which are secured over the upper end of the well.

3. A filter device comprising a pair of cloth filter discs for use in a horizontal plane and adapted to be positioned over a well opening of a coffee maker with the periphery of the discs bent over the wall of the well, and elongated narrow element of relatively stiff material located between said discs, said element being adapted to span the distance across the coffee maker well opening and of such length as not to interfere with the bending over of the periphery of the discs for retaining said cloth filter discs against downward sagging within the well opening as a result of liquid passing therethrough and interfering with free flow of liquid.

FREDERICK STOCKER.